(12) United States Patent
Todoroski

(10) Patent No.: US 6,539,828 B2
(45) Date of Patent: Apr. 1, 2003

(54) C. N. C. LATHE PARTS CATCHER

(76) Inventor: Bosko Todoroski, 53848 Applewood, Shelby Township, MI (US) 48315

( * ) Notice: Subject to any disclaimer, the term of this patent is extended or adjusted under 35 U.S.C. 154(b) by 31 days.

(21) Appl. No.: 09/847,025

(22) Filed: May 1, 2001

(65) Prior Publication Data

US 2002/0162430 A1 Nov. 7, 2002

(51) Int. Cl.$^7$ .............................. B23B 1/00; B23B 7/00
(52) U.S. Cl. .......................................... 82/1.11; 82/118
(58) Field of Search ............................. 82/47, 46, 120, 82/121, 124, 152, 173, 50, 117, 118, 119, 901; 407/2, 3, 4, 5, 6; 83/167; 29/DIG. 79, 94, 102; 37/91, 94, 306, 444, 443, 903

(56) References Cited

U.S. PATENT DOCUMENTS

| | | | | | |
|---|---|---|---|---|---|
| 1,788,240 | A | * | 1/1931 | Karcevsk | 470/58 |
| 3,889,559 | A | * | 6/1975 | Scholtes | 82/124 |
| 4,183,269 | A | * | 1/1980 | Molliex | 82/124 |
| 4,463,634 | A | * | 8/1984 | Lee | 82/152 |
| 5,072,635 | A | * | 12/1991 | White | 82/124 |
| 5,186,086 | A | * | 2/1993 | Wetherill et al. | 82/124 |
| 6,055,750 | A | * | 5/2000 | Yoder et al. | 37/352 |

FOREIGN PATENT DOCUMENTS

GB      2127717 A  *  4/1984  ............ B23Q/7/08

\* cited by examiner

*Primary Examiner*—Steven C. Bishop
*Assistant Examiner*—Don J Bleasdell
(74) *Attorney, Agent, or Firm*—Gregory T. Zalecki

(57) ABSTRACT

A device for catching cut off workpieces from a C. N. C. lathe, the lathe having a toolholding turret and a turret back wall. The device attaches to the turret. A basket for catching cut off workpieces is attached to a bracket. The bracket is shaped to be attachable to the turret, to permit the basket to fit underneath the workpiece and to permit the basket to clear the turret back wall when the turret is rotated about its axis into any position. Preferably, an L-shaped bracket is used for octagon type turrets and an oblique angled bracket is used for VDI turrets. One version of the invention comprises a lathe to which a C. N. C. parts catcher is attached. Another version of the invention is a method for catching workpieces cut off from the spindle of a C. N. C. lathe.

23 Claims, 4 Drawing Sheets

Figure 1:
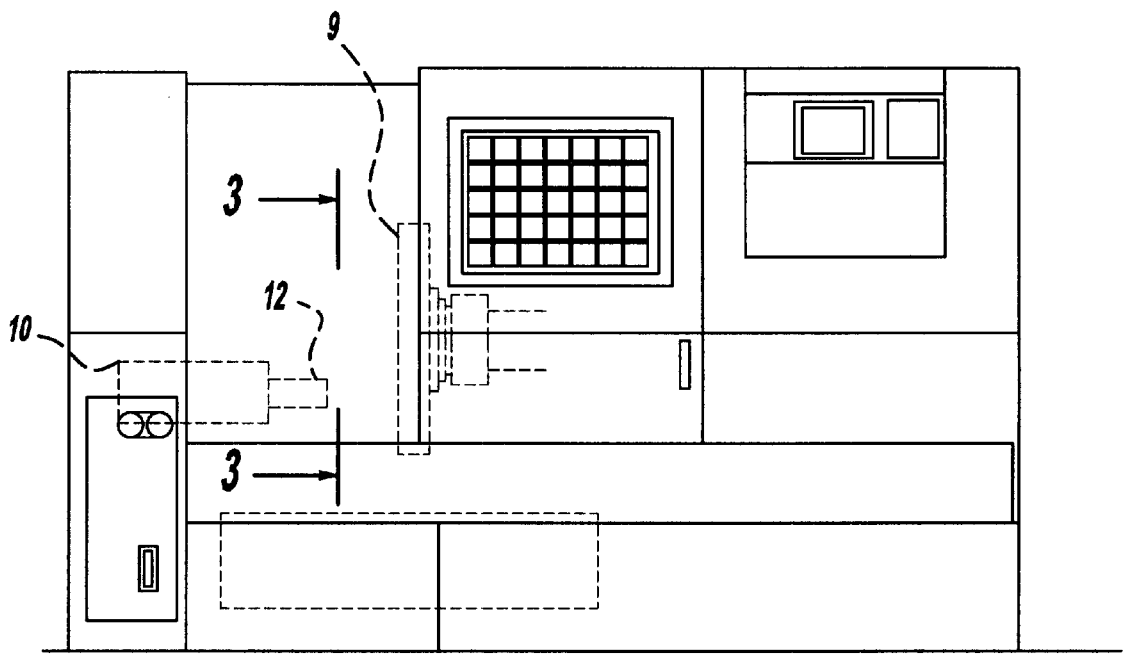

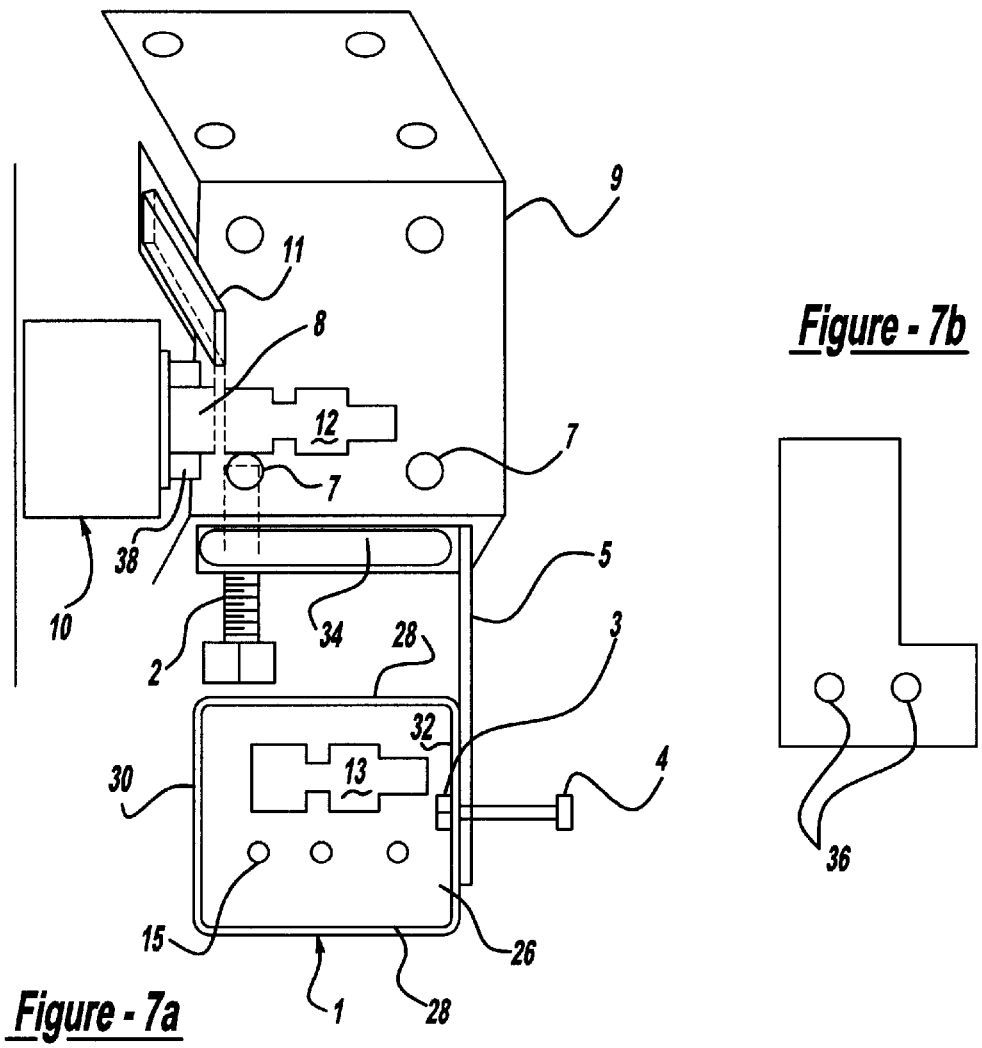
*Figure - 7b*
*Figure - 7a*
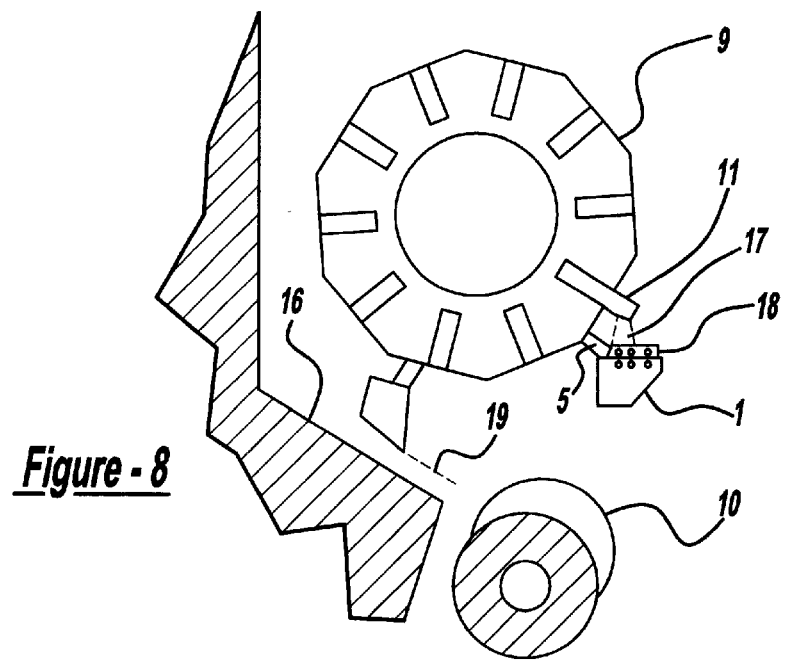
*Figure - 8*

C. N. C. LATHE PARTS CATCHER

BACKGROUND

A C. N. C. lathe is similar to a traditional lathe. It has a rotating spindle which holds a workpiece. A toolholder holds tools which are applied to the workpiece to make desired precision cuts upon the workpiece. A C. N. C. lathe typically has a turret which is capable of holding between 1 and 12 tools. During the operation of the machine the turret is rotated and then moved in order to apply the desired tool to the workpiece at the desired location. The selection of the tool and the position of its application to the workpiece is programmed into the C. N. C. lathe by the operator. A C. N. C. lathe is capable of having many tools applied sequentially to many positions of the workpiece. The last step of most machining processes is the application of a cutoff tool to the workpiece. After this step, the finished part falls to the bottom of the machine.

A number of problems are associated with the finished part falling to the bottom of the machine at the completion of the machining process. The part may be damaged due to the fall. The operator may be endangered by moving mechanical parts when he or she attempts to retrieve the finished part. The operator's clothing and skin may become soiled during the retrieval process. The operator may attempt to catch the falling part by hand. This would expose the operator to flying machine scrap, moving mechanical parts capable of causing serious physical injury or burns caused by the high temperature of the finished part.

Information relevant to attempts to address these problems can be found in U.S. Pat. Nos. 4,183,269, 4,463,634 and 5,072,635. However, each one of these references suffers from one or more of the following disadvantages. They involve complex machinery. They are costly to manufacture. They are subject to breakdowns during extended use. They are difficult to use and difficult to learn how to use. They do not attach to the lathe turret.

There is a need for a simple, low-cost device, attachable to a C. N. C. lathe turret, to catch parts as they are cut off from the lathe spindle. The device should be easily installable and removable.

SUMMARY

The present invention is directed to a C. N. C. lathe parts catcher that satisfies these needs. The C. N. C. lathe parts catcher is intended for use on a C. N. C. lathe. Such lathes have a toolholding turret and a turret back wall. A C. N. C. lathe parts catcher having features of the present invention comprises a basket and a bracket. The basket catches cutoff lathe workpieces. The bracket is attached to the basket. The bracket is shaped to be attachable to the turret. The bracket is also shaped to permit the basket to fit underneath the workpiece for catching the cutoff workpiece when a cutoff tool mounted to the turret is in contact with the workpiece. Preferably, the bracket is shaped to permit the basket to clear the turret back wall when the turret is rotated about its axis into any position. When the turret is fully rotated about its axis, at some point during the rotation, the distance between the basket and the turret back wall is at its minimum. If clearance is not maintained between the basket and the turret back wall, the basket will interfere with the turret back wall if the turret is fully rotated about its axis.

Two types of turrets are commonly used on C. N. C. lathes. One is known as an octagon turret. The other is known as a VDI turret. Both octagon turrets and VDI turrets perform the same function. They hold lathe tools while the tools are being applied to a rotating workpiece. The position where the tools are secured to the turret is different for VDI turrets and octagon turrets. Although octagon turrets typically have eight faces for attaching tools, they may have more or less faces. The C. N. C. lathe parts catcher can be used on a VDI turret or an octagon type turret, irrespective of the number of faces. The shape of the preferred bracket for use on a VDI turret differs from the shape of the preferred bracket for use on an octagon type turret.

On an octagon type turret the bracket is, preferably, an L-shaped bracket. One end of the L-shaped bracket has a slot for mounting to the turret. This slot also provides adjustability of the bracket along an axis substantially parallel to the longitudinal axis of the workpiece. The other end of the bracket has a downwardly protruding ear. The ear has one or more holes for fastening the bracket the basket. The holes also permit the adjustability of the basket position relative to the turret.

On a VDI turret the bracket is, preferably, an oblique angled bracket. One end of the oblique angled bracket has a slot for fastening to the turret. This slot also provides adjustability of the position of the bracket with respect to the turret. The other end of the bracket has one or more holes for fastening the bracket to the basket. The holes permit the adjustability of the position of the basket relative to the turret.

The preferred version of a C. N. C. lathe parts catcher intended for use on an octagon type turret has one or more holes in a sidewall of its basket. The holes are used to fasten the basket to the bracket. The bracket has a slot at one end for fastening to the turret and one or more holes at the other end for fastening to the basket. The bracket is shaped to permit the slotted end to be fastened to the turret. It is shaped to permit the end of the bracket having the holes to be fastened to the basket. It is shaped to permit the bracket and basket position to be adjusted along the axis substantially parallel to the longitudinal axis of the lathe workpiece. It is shaped to permit the simultaneous adjustability of the distance between a cutoff tool mounted to the turret and the basket and the distance between the basket and the turret back wall when that distance is minimized by turret rotation along the turret axis by the selection of different combinations of bracket holes and basket holes for fastening the bracket to the basket. The bracket is shaped to permit the basket to be positioned underneath the workpiece for catching the finished workpiece when the cutoff tool mounted to the turret is in contact with the workpiece. It is shaped to permit rotation adjustment of the basket about the selected basket hole and bracket hole. Preferably, the bracket is an L-shaped bracket as previously described. A fastener for attaching the basket to the bracket at a selected basket hole and a selected bracket hole and to fix the rotated position of the basket about the selected basket hole and bracket hole is inserted through the selected bracket hole and basket hole. This secures the basket to the bracket. Preferably, the sidewall containing the one or more holes has a height greater than the height of the remaining basket walls. This provides greater adjustability of the basket position.

The preferred version of a C. N. C. lathe parts catcher intended for use on a VDI turret is similarly constructed with the following modifications. There is no need for holes in the sidewall, nor a raised sidewall. However, the basket may nevertheless have these features in order to permit the C. N. C. lathe parts catcher to be used on either a VDI turret or an octagon type turret. The end wall of the basket nearest the turret has an opening for attachment to the bracket.

Preferably, the opening is a slot. The bracket is an oblique angled bracket as previously described.

Another version of the invention comprises a lathe having a toolholding turret and a turret back wall comprising a basket for catching cutoff lathe workpieces and a bracket attached to the basket and to the turret. The bracket is shaped to be attachable to the turret and to permit the basket to fit underneath the workpiece for catching the cutoff workpiece when a cutoff tool mounted to the turret is in contact with the workpiece. Preferably, the bracket is an L-shaped bracket. One end of the L-shaped bracket has a slot for mounting to the turret and to provide adjustability of the bracket along the axis substantially parallel to the longitudinal axis of the workpiece. The other end of the bracket has a downwardly protruding ear. The ear has one or more holes for fastening the bracket to the basket and to permit the adjustability of the basket position relative to the turret. If the lathe has a VDI turret, an oblique angled bracket is used. One end of the oblique angled bracket has a slot for fastening to the turret and to provide adjustability of the position of the bracket with respect to the turret. The other end of the bracket has one or more holes for fastening the bracket to the basket and to permit the adjustability of the position of the basket relative to the turret.

Another version of the invention is a method for catching workpieces cut off from the spindle of a C. N. C. lathe having a toolholding turret and a turret back wall. This method comprises the following steps. A C. N. C. lathe parts catcher, as described above, is selected. It is attached to the turret of the C. N. C. lathe such that the basket fits underneath the workpiece for catching the cutoff workpiece when a cutoff tool mounted to the turret is in contact with the workpiece. The workpiece is machined into the desired configuration. The workpiece is cut off with a cutoff tool attached to the toolholding turret. The cutoff workpiece is caught in the basket of the C. N. C. lathe parts catcher. Preferably, the C. N. C. lathe parts catcher is attached to the toolholding turret such that the basket clears the turret back wall when the turret is rotated about its axis into any position.

DRAWINGS

These and other features, aspects, and advantages of the present invention will become better understood with regard to the following description, appended claims, and accompanying drawings where:

FIG. 1 is a front elevation view of a C. N. C. lathe.

Figure 2:
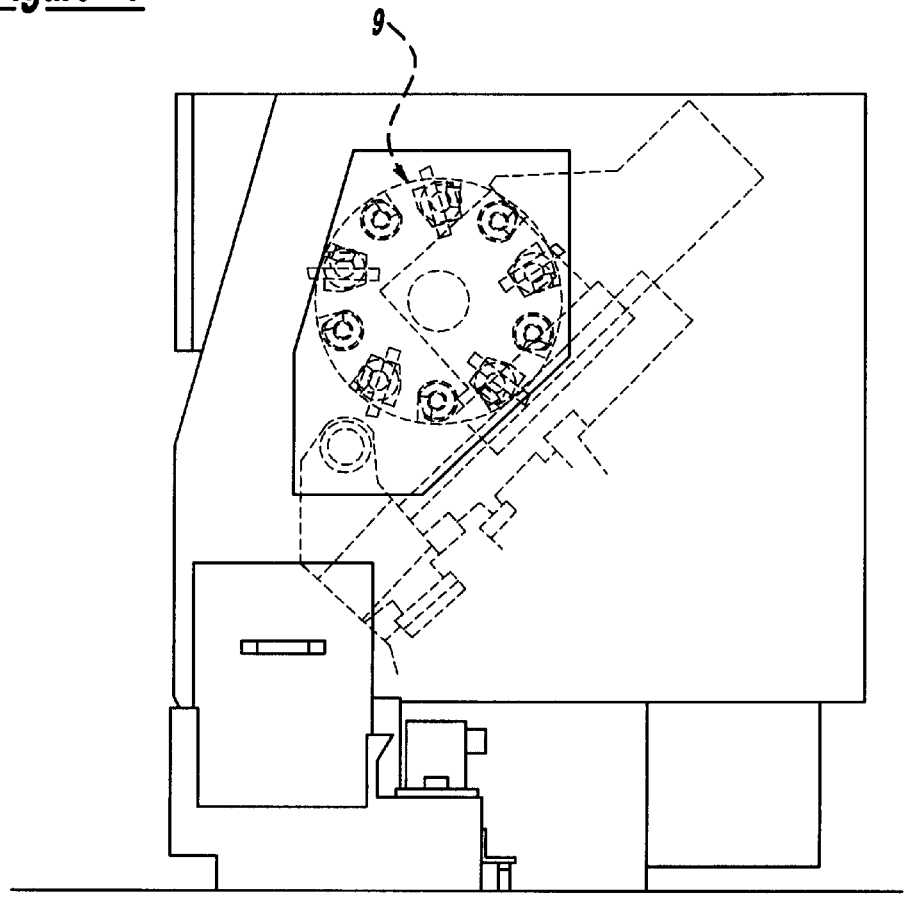

FIG. 2 is a side elevation view of the C. N. C. lathe of FIG. 1, showing the lathe turret.

Figure 3:
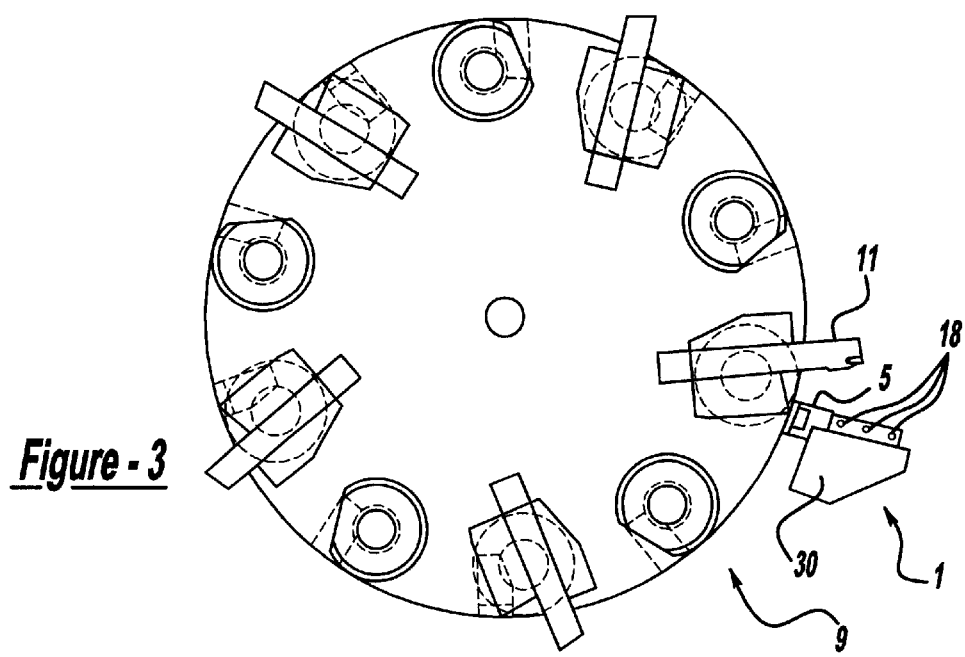

FIG. 3 is a front section elevation view of the lathe turret of FIG. 2 at line 3—3 of the C. N. C. lathe of FIG. 1.

Figure 4:
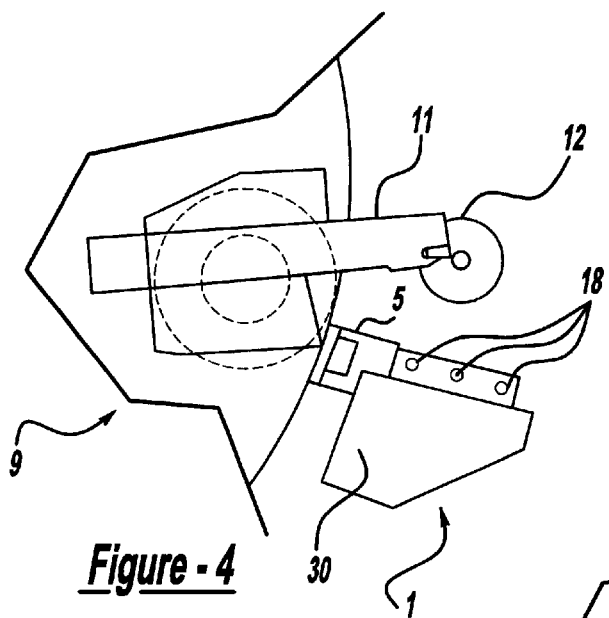

FIG. 4 is a partial elevation view of a cutoff tool and the C. N. C. lathe parts catcher attached to the turret of FIG. 3, showing a workpiece partially cutoff.

Figure 5:
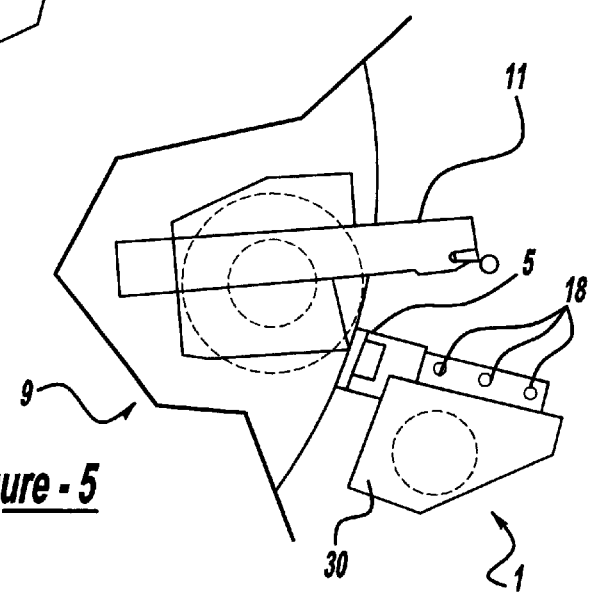

FIG. 5 is a partial elevation view of a cutoff tool and the C. N. C. lathe parts catcher attached to the turret of FIG. 3, showing a fully cut off workpiece within the the basket of catcher.

Figure 6:
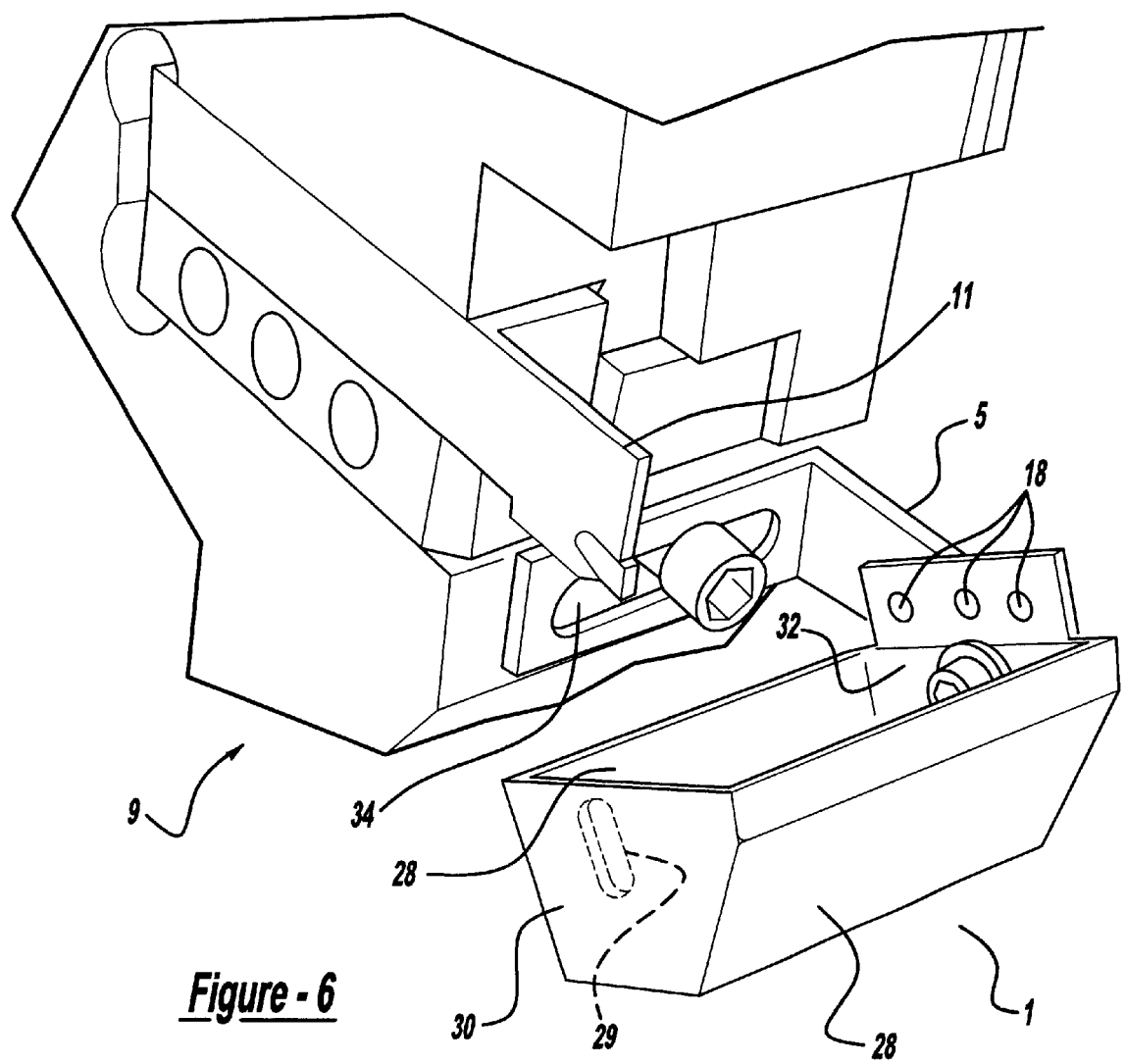

FIG. 6 is a perspective view of the C. N. C. lathe parts catcher mounted to an octagon turret.

FIG. 7a is a top plan view of the C. N. C. lathe parts catcher of FIG. 6.

FIG. 7b is a top plan view of the ear section of the bracket of the C. N. C. lathe parts catcher shown in FIG. 7a, rotated 90 degrees counterclockwise.

FIG. 8 is a side elevation view of a C. N. C. lathe turret, attached parts catcher, spindle and turret back wall.

Figure 9:
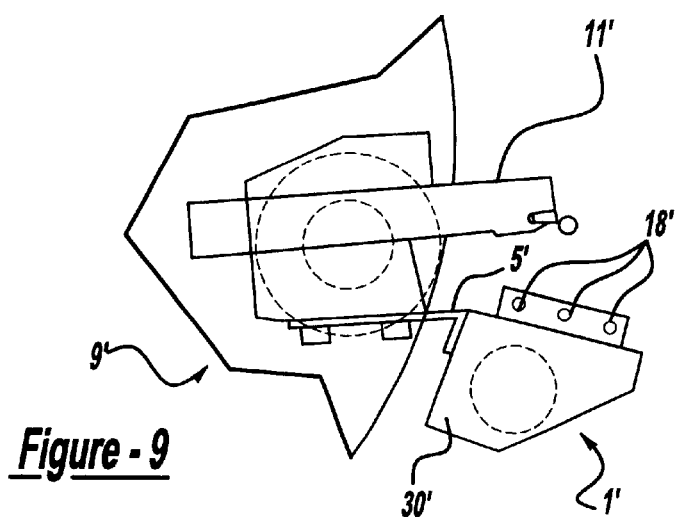

FIG. 9 is a side elevation view of a second version of the C. N. C. lathe parts catcher mounted to a VDI turret.

DESCRIPTION

The preferred embodiment of this invention is shown in FIGS. 6 through 8. There, the C. N. C. lathe parts catcher is shown mounted to an octagon turret. The C. N. C. lathe parts catcher catches workpieces 12, which are cut off while mounted in the spindle 10 of a lathe, in a basket 1. The basket 1 is comprised of a floor 26, two end walls 28, a sidewall having the same height as the end walls 30 and a raised sidewall 32. The floor 26, end walls 28, sidewall 30 and raised side wall 32 are attached together to form an open box 1, as shown in FIG. 6.

During the operation of the C. N. C. lathe, the workpiece 12 is mounted within the spindle 10, secured by a chuck 38 and mechanically rotated. Tools are mounted to the turret 9 of the C. N. C. lathe. The turret mounted tools are brought into contact with the rotating workpiece 12 by precise tool-workpiece positioning programmed into the C. N. C. lathe by the operator. One of the tools typically mounted to the turret is a cutoff tool 11. The last step of the machining operation is to apply the cutoff tool 11 to the workpiece 12 such that the workpiece 12 is severed and falls away from the remaining workpiece mounted within the spindle 10. The C. N. C. lathe parts catcher is intended to catch the workpiece 12 within the basket 1 as it falls, as shown in FIGS. 3–5.

During machining operations coolant is applied to the workpiece where it meets the tool. The floor 26 of the basket 1 has one or more holes 15 which allow the coolant to drain from the basket 1.

The raised sidewall 32 is higher than the remaining walls. It contains one or more holes 18 for fastening to a bracket 5.

The bracket 5 has a slot 34 at one end for fastening to the turret 9. It has one or more holes 36 at the other end for fastening to the basket 1. The bracket 5 is shaped to permit the slotted end to be fastened to the turret 9. The bracket 5 is shaped to permit the end of the bracket having the holes 36 to be fastened to the basket 1. The bracket 5 is shaped to permit the bracket and basket position to be adjusted along an axis substantially parallel to the longitudinal axis of the lathe workpiece 12. The bracket 5 is shaped to permit the simultaneous adjustability of the distance 17 between the cutoff tool 11 mounted to the turret 9 and the basket 1 and the distance 19 between the basket 1 and the turret back wall 16 when that distance 19 is minimized by turret rotation along the turret axis, by the selection of different combinations of bracket holes 36 and basket holes 18 for fastening the bracket 5 to the basket 1. The bracket 5 is shaped to permit the basket 1 to be positioned underneath the workpiece 12 for catching the finished workpiece when the cutoff tool mounted to the turret 11 is in contact with the workpiece 12. The bracket 5 is shaped to permit rotation adjustment of the basket 1 about the selected basket hole 18 and selected bracket hole 36.

The preferred shape of the bracket 5 is shown in FIG. 6 and FIGS. 7a and 7b. The bracket is L-shaped. One end of the "L" contains the slot 34 to provide adjustability of the bracket along the axis substantially parallel to the longitudinal axis of the lathe workpiece 12. The other end of the bracket 5 contains a downwardly protruding ear. The ear contains one or more holes 36 for fastening the bracket 5 to the basket 1 and to permit the adjustability of the basket 1 relative to the turret 9.

The slotted end of the bracket 5 is attached to the turret 9 by a turret bolt 2. The turret bolt 2 is inserted through the slot 34 in the bracket 5 and screwed into a threaded tool hole 7 located on the face of the turret 9. When the turret bolt 2 is loosened from the threaded hole 7 the position of the bracket 5 and basket 1 along the axis substantially parallel to the longitudinal axis of the lathe workpiece 12 may be adjusted. After adjustment, the bracket 5 and basket 1 are securely fixed into position by tightening the turret bolt 2.

The basket 1 is attached to the bracket 5 at the selected basket hole 18 and selected bracket hole 36 by a basket bolt 4 and a basket nut 3. When the basket bolt 4 and the basket nut 3 are loosened the basket 1 may be adjustably rotated about the selected basket hole 18 and bracket hole 36.

Some C. N. C. lathes use a turret known as VDI turret. These turrets require that the bracket 5' be shaped differently. They also require that the basket contain a slot 29 in the end wall 28 proximal to the turret for attaching the basket to the bracket. An oblique angled bracket is preferred. One end of the bracket 5' contains a slot for attaching the bracket 5' to a toolholder mounted to the turret 9. The other end of the bracket contains holes for attaching the bracket 5' to the basket 1'. The basket 1' is attached to the bracket 5' by inserting a bolt through the basket slot 29 into one of holes of the bracket and securing the basket to the bracket by tightening a nut onto the bolt. The position of the basket 1' can be adjusted by changing the position of the bracket slot relative to the turret 9 and by adjusting the position of the basket 1' relative to the other end of the bracket 5'.

Preferably, the basket 1 is constructed from durable plastic for strength and protection of the workpiece 12. Preferably, the bracket 5 is constructed from metal. The basket and bracket may be comprised of one integral piece. For example, a one piece basket-bracket assembly may be molded from plastic. This will result in a lower manufacturing cost, but will sacrifice some of the adjustability of the basket position.

The C. N. C. lathe parts catcher is used as follows. The C. N. C. lathe is programmed to perform the desired machining operation upon the workpiece 12. The workpiece 12 is inserted and secured within the spindle 10 by the chuck 38. A bracket hole 36 and a basket hole 18 are selected to provide the desired clearance 17 between the cutoff tool 11 and the basket 1. This clearance 17 must be at least one-half the diameter of the workpiece in order to avoid interference between the basket 1 and the workpiece 12 during the machining operation. The basket 1 is loosely attached to the bracket 5 with the basket bolt 4 and the basket nut 3 to permit adjustability. The operator must also ensure that there is some clearance 19 between the basket 1 and the lathe back wall 16 when the turret rotation brings the basket 1 into closest proximity with the lathe back wall 16. When the desired clearances are obtained, the basket bolt 4 and the basket nut 3 are tightened. The alignment between the basket 1 and the bracket 5 can be readjusted when necessary. This may involve loosening the basket bolt 4 and rotating the basket 1; or, it may involve selecting a different combination of bracket hole 36 and basket hole 18. When the desired clearances are obtained the basket bolt 4 is tightened.

The slotted end of the bracket 5 is then loosely attached to the turret 9 with the turret bolt 2. The bracket 5 is positioned so that the finished workpiece 12 will be caught, when it is cutoff, and the basket 1 will not interfere with the spindle 10 during the machining operation. When the desired alignment is obtained, the turret bolt 2 is tightened. If necessary, the basket position can be readjusted by loosening and tightening the turret bolt 2, by loosening and tightening the basket bolt 4, or by selecting different bracket holes 36 and basket holes 18.

After the C. N. C. lathe parts catcher is aligned, adjusted and secured to the turret 9, the operator proceeds to machine the workpiece 12. During the last step of the machining process the workpiece 12 is cutoff by the cutoff tool 11. The finished 13 part falls into the basket 1. The operator then removes the part from the basket 1. Any scrap chips which result from the final cut off operation, will fall out of the basket 1, as the basket 1 turns over when the turret 9 is rotated.

What is claimed is:

1. A C. N. C. lathe parts catcher for use on a C. N. C. lathe having a toolholding turret and a turret back wall comprising:

(a) a basket for catching cut off lathe workpieces; and
    (b) a bracket attached to the basket, the bracket being shaped to be attachable to the turret and being shaped to permit the basket to fit underneath the workpiece for catching the cut off workpiece when a cutoff tool mounted to the turret is in contact with the workpiece.

2. The C. N. C. lathe parts catcher recited in claim 1, wherein the bracket is shaped to permit the basket to clear the turret back wall when the turret is rotated about its axis into any position.

3. The C. N. C. lathe parts catcher recited in claim 1, wherein the basket and bracket are comprised of one integral piece.

4. The C. N. C. lathe parts catcher recited in claim 2, wherein the basket and bracket are comprised of one integral piece.

5. The C. N. C. lathe parts catcher recited in claim 1, wherein the bracket is an L-shaped bracket, one end of the L-shaped bracket having a slot for mounting to the turret and to provide adjustability of the bracket along an axis substantially parallel to the longitudinal axis of the workpiece, and the other end of the bracket having a downwardly protruding ear, the ear having one or more holes for fastening the bracket to the basket and to permit the adjustability of the basket position relative to the turret.

6. The C. N. C. lathe parts catcher recited in claim 2, wherein the bracket is an L-shaped bracket, one end of the L-shaped bracket having a slot for mounting to the turret and to provide adjustability of the bracket along an axis substantially parallel to the longitudinal axis of the workpiece, and the other end of the bracket having a downwardly protruding ear, the ear having one or more holes for fastening the bracket to the basket and to permit the adjustability of the basket position relative to the turret.

7. The C. N. C. lathe parts catcher recited in claim 3, wherein the bracket is an L-shaped bracket, one end of the L-shaped bracket having a slot for mounting to the turret and to provide adjustability of the bracket along an axis substantially parallel to the longitudinal axis of the workpiece.

8. The C. N. C. lathe parts catcher recited in claim 4, wherein the bracket is an L-shaped bracket, one end of the L-shaped bracket having a slot for mounting to the turret and to provide adjustability of the bracket along an axis substantially parallel to the longitudinal axis of the workpiece.

9. A C. N. C. lathe having a toolholding turret and a turret back wall comprising:

(a) a basket for catching cut off lathe workpieces; and
    (b) a bracket attached to the basket and to the turret, the bracket being shaped to be attachable to the turret and being shaped to permit the basket to fit underneath the workpiece for catching the cut off workpiece when a cutoff tool mounted to the turret is in contact with the workpiece.

10. The C. N. C. lathe recited in claim 9, wherein the bracket is an L-shaped bracket, one end of the L-shaped bracket having a slot for mounting to the turret and to provide adjustability of the bracket along an axis substantially parallel to the longitudinal axis of the workpiece, and the other end of the bracket having a downwardly protruding ear, the ear having one or more holes for fastening the bracket to the basket and to permit the adjustability of the basket position relative to the turret.

11. The C. N. C. lathe recited in claim 9, wherein the bracket is an oblique angled bracket, one end of the oblique angled bracket having a slot for fastening to the turret and to provide adjustability of the position of the bracket with respect to the turret, and the other end of the bracket having one or more holes for fastening the bracket to the basket and to permit the adjustability of the position of the basket relative to the turret.

12. A C. N. C. lathe parts catcher for use on a C. N. C. lathe having a toolholding turret and a turret back wall comprising:
   a. a basket for catching cut off lathe workpieces, the basket having a sidewall having one or more holes for fastening to a bracket;
   b. a bracket having a slot at one end for fastening to the turret and one or more holes at the other end for fastening to the basket, the bracket being shaped to permit the slotted end to be fastened to the turret, being shaped to permit the end of the bracket having the holes to be fastened to the basket, being shaped to permit the bracket and basket position to be adjusted along an axis substantially parallel to the longitudinal axis of the lathe workpiece, being shaped to permit the simultaneous adjustability of the distance between a cutoff tool mounted to the turret and the basket and the distance between the basket and the turret back wall when that distance is minimized by turret rotation along the turret axis by the selection of different combinations of bracket holes and basket holes for fastening the bracket to the basket, being shaped to permit the basket to be positioned underneath the workpiece for catching the finished workpiece when the cutoff tool mounted to the turret is in contact with the workpiece, and being shaped to permit rotation adjustment of the basket about the selected basket hole and bracket hole; and
   c. a fastener for attaching the basket to the bracket at a selected basket hole and a selected bracket hole and to fix the rotated position of the basket about the selected basket hole and bracket hole, inserted through the selected bracket hole and basket hole, thereby securing the basket to the bracket.

13. The C. N. C. lathe parts catcher recited in claim 12, wherein the basket has one sidewall height greater than the height of the remaining basket walls, the higher sidewall containing the one or more holes.

14. The C. N. C. lathe parts catcher recited in claim 12, wherein the bracket is an L-shaped bracket, one end of the L-shaped bracket having the slot for mounting to the turret and to provide adjustability of the bracket along the axis substantially parallel to the longitudinal axis of the workpiece, and the other end of the bracket having a downwardly protruding ear, the ear having the one or more holes for fastening the bracket to the basket and to permit the adjustability of the basket position relative to the turret.

15. The C. N. C. lathe parts catcher recited in claim 13, wherein the bracket is an L-shaped bracket, one end of the L-shaped bracket having the slot for mounting to the turret and to provide adjustability of the bracket along an axis substantially parallel to the longitudinal axis of the workpiece, and the other end of the bracket having a downwardly protruding ear, the ear having the one or more holes for fastening the bracket to the basket and to permit the adjustability of the basket position relative to the turret.

16. The C. N. C. lathe parts catcher recited in claim 12, wherein the floor of the basket has one or more holes for allowing coolant to drain from the basket.

17. The C. N. C. lathe parts catcher recited in claim 13, wherein the floor of the basket has one or more holes for allowing coolant to drain from the basket.

18. The C. N. C. lathe parts catcher recited in claim 14, wherein the floor of the basket has one or more holes for allowing coolant to drain from the basket.

19. The C. N. C. lathe parts catcher recited in claim 15, wherein the floor of the basket has one or more holes for allowing coolant to drain from the basket.

20. A C. N. C. lathe parts catcher for use on a C. N. C. lathe having a toolholding turret and a turret back wall comprising:
   (a) a basket for catching cut off lathe workpieces, the basket having an endwall having one or more openings for fastening to a bracket;
   (b) an oblique angled bracket having an opening at one end for fastening to the turret and one or more openings at the other end for fastening to the basket, the bracket being shaped to permit one end to be fastened to the turret, being shaped to permit the other end of the bracket to be fastened to the basket, being shaped to permit the simultaneous adjustability of the distance between a cutoff tool mounted to the turret and the basket and the distance between the basket and the turret back wall when that distance is minimized by turret rotation along the turret axis by the selection of different combinations of bracket openings and basket openings for fastening the bracket to the basket and being shaped to permit the basket to be positioned underneath the workpiece for catching the finished workpiece when the cutoff tool mounted to the turret is in contact with the workpiece; and
   (c) a fastener for attaching the basket to the bracket at a selected basket opening and bracket opening inserted through the selected bracket opening and basket opening.

21. The C. N. C. lathe parts catcher recited in claim 20, wherein the floor of the basket has one or more holes for allowing coolant to drain from the basket.

22. A method for catching workpieces cut off from the spindle of a C. N. C. lathe having a toolholding turret and a turret back wall comprising the steps of:
   (a) selecting a C. N. C. lathe parts catcher comprising a basket for catching cut off lathe workpieces and a bracket attached to the basket, the bracket being shaped to be attachable to the turret and being shaped to permit the basket to fit underneath the workpiece for catching the cut off workpiece when a cutoff tool mounted to the turret is in contact with the workpiece;

(b) attaching the C. N. C. lathe parts catcher to the toolholding turret such that the basket fits underneath the workpiece for catching the cut off workpiece when a cutoff tool mounted to the turret is in contact with the workpiece;

(c) machining the workpiece into the desired configuration;

(d) cutting off the workpiece with a cutoff tool attached to the toolholding turret; and (e) catching the cut off workpiece in the basket of the C. N. C. lathe parts catcher.

23. The method for catching workpieces cut off from the spindle of a C. N. C. lathe having a toolholding turret and a turret back wall recited in claim 22, wherein the C. N. C. lathe parts catcher is attached to the toolholding turret such that the basket clears the turret back wall when the turret is rotated about its axis into any position.

* * * * *